United States Patent [19]
Henley et al.

[11] Patent Number: 4,565,431
[45] Date of Patent: Jan. 21, 1986

[54] PHOTOGRAPHIC CAMERA AND FLASH ASSEMBLY

[75] Inventors: Charles J. Henley, Macedon; Frederick W. Harvey, Webster, both of N.Y.

[73] Assignee: Eastman Kodak Company, Rochester, N.Y.

[21] Appl. No.: 686,106

[22] Filed: Dec. 24, 1984

[51] Int. Cl.⁴ .............................................. G03B 15/04
[52] U.S. Cl. ..................... 354/135; 354/143; 362/15
[58] Field of Search ............... 354/135, 142, 143, 144, 354/148; 362/15

[56] References Cited

U.S. PATENT DOCUMENTS

| | | | |
|---|---|---|---|
| 2,427,969 | 9/1947 | Lester | 362/14 |
| 3,111,073 | 11/1963 | Mueller | 95/11.5 |
| 3,392,644 | 7/1968 | Beach | 95/11 |
| 3,456,567 | 7/1969 | von Albedyll | 95/11.5 |
| 3,473,454 | 10/1969 | Stutz et al. | 95/11 |
| 3,517,595 | 6/1970 | Wagner et al. | 95/11.5 |
| 3,527,150 | 9/1970 | Montalto et al. | 95/11 |
| 3,576,155 | 4/1971 | Beach | 95/11.5 |
| 3,576,156 | 4/1971 | Michatek | 95/11.5 |
| 3,583,301 | 6/1971 | Wareham | 95/11 |
| 3,584,794 | 6/1971 | Beach | 240/1.3 |
| 3,651,745 | 3/1972 | Ewald | 95/11.5 |
| 3,727,040 | 4/1973 | Armstrong et al. | 240/1.3 |
| 3,728,069 | 4/1973 | Burke, Jr. | 431/93 |
| 3,866,033 | 2/1975 | Stacy et al. | 240/1.3 |
| 3,958,258 | 5/1976 | Beach | 354/135 |
| 4,183,648 | 1/1980 | Harvey et al. | 354/135 |
| 4,298,908 | 11/1981 | English et al. | 362/14 |
| 4,349,259 | 9/1982 | Meyer et al. | 354/135 |

Primary Examiner—William B. Perkey
Attorney, Agent, or Firm—Roger A. Fields

[57] ABSTRACT

In a multilamp flash assembly adapted for attachment to a camera having a flashlamp firing circuit, the respective flashlamps are advanced sequentially to a firing position. A lamp advancing member in the flash assembly is made of an electrically conductive material and is disposed to form an integral part of the firing circuit when the flash assembly is attached to the camera. The advancing member is movable to establish an electrical connection with the respective flashlamps, one at a time, and to advance a flashlamp electrically connected with the advancing member to the firing position. Thus, the advancing member operates as an electrical contact for a flashlamp, as well as for advancing the lamp to the firing position.

In an alternate embodiment, the advancing member is disposed in the camera.

18 Claims, 4 Drawing Figures

PHOTOGRAPHIC CAMERA AND FLASH ASSEMBLY

BACKGROUND OF THE INVENTION

1. Field of the Invention

The invention generally relates to a multilamp photoflash assembly and to a camera for use with such an assembly. More particularly, the invention relates to apparatus for advancing a plurality of flashlamps in the assembly sequentially to a firing position and for establishing an electrical connection between the respective flashlamps and a flashlamp firing circuit in the camera.

2. Description of the Prior Art

The trend in photoflash devices has been toward the use of subminiature flashlamps in compact, disposable, multilamp units to provide camera users with the advantages of greater convenience, compactness and portability. A widely used flashlamp unit of this type is known generally in the trade as a "flashcube", a specific embodiment of which is shown in U.S. Pat. No. 3,651,745, for example. The flashcube comprises a set of four flashlamps, each with its own reflector, mounted on a base and enclosed within a transparent plastic cover. Each of the lamp-reflector assemblies faces a respective one of the four side walls of the flashcube. A spindle depends from the center of the cube base to rotatably support the unit in a complementary receiving socket on a camera. In operation, the flashcube is sequentially rotated a quarter of a turn at a time, usually in response to each actuation of a film advance mechanism in the camera, to successively place unused lamps in a firing position facing the object being photographed. Each of the flashlamps consists of an hermetically sealed, light transmitting glass envelope containing a filamentary combustible material, such as shredded zirconium foil, and a combustion supporting gas, such as oxygen. In the case of flashcubes employing flashlamps that are electrically ignited (as opposed to being percussively ignited), a pair of lead-in wires extend into the lamp envelope to support a filament in combination with globules of ignition paste within the envelope. When the flashcube is in the firing position, segments of the lead-in wires disposed outside the lamp envelope are securely engaged with fixed electrical contacts in the camera socket. The electrical contacts in turn are connected by electrical conductors and a shutter actuated switch to the camera power source, usually one or more batteries. When a photographer actuates the shutter release mechanism to take a picture, by the same operation, the electrical circuit from the batteries to the ignition system in the flashlamp is closed to thereby fire the lamp. The timing of the ignition of the combustible material in the flashlamp is synchronized with the exposure of the film to obtain an efficient utilization of the light from the ignited lamp.

A more recent development in connection with compact multilamp flash units is a flashlamp magazine comprising a housing in which an endless belt carrying a plurality of flashlamps is disposed. The respective flashlamps are advanced sequentially to a firing position at a window in the housing by a sprocket wheel. The sprocket wheel engages the endless belt and is driven by a rotor activated by a film advancing mechanism in a camera, to which the flashlamp magazine is attached. As shown in U.S. Pat. No. 3,866,033, the flashlamps are percussively ignited and include associated striker springs and reflector segments. Each combination of a lamp, a striker spring, and a reflector segment is mounted on a pallet on the endless belt to provide an individual flash unit. A mechanical coupling in the magazine extends between the firing location and an access opening in the magazine. The mechanical coupling transmits a mechanical impulse from an actuating member in the camera to individually release a striker spring to fire the flashlamp in the firing position. Such magazines are particularly advantageous in that they may be readily designed to include a sufficient number of flashlamps for use with an entire roll or cartridge of film. For example, a twelve lamp magazine may be used with a twelve exposure roll of film.

When using a flashcube or other multilamp flash assembly in which the respective flashlamps are advanced sequentially to a firing position, as in the examples described above, a first device advances each of the lamps to the firing position, and a second device connects (electrically in the case of electrically ignited lamps, and mechanically in the case of percussively ignited lamps) with each of the lamps to fire the respective lamps. In the case of electrically ignited flashlamps, the second device must establish an electrical connection between a flashlamp firing circuit in the camera and the lead-in wires of a flashlamp. This is illustrated in U.S. Pat. Nos. 3,392,644; 3,473,454; and 3,651,745. The requirement of separate devices for advancing a flashlamp to a firing position and for establishing an electrical connection between the flashlamp and a firing circuit, as in the patents, is undesirable in view of the current trend toward smaller and less expensive cameras and compact multilamp flash assemblies. Such a requirement increases the size, manufacturing cost, and mechanical complexity of the camera and/or the flash assembly.

SUMMARY OF THE INVENTION

The requirement of separate devices for flashlamp contact and for flashlamp advance, as in the prior art, is believed to be obviated by the invention.

According to one form of the invention, there is provided, in a multilamp flash assembly of the type wherein (a) a plurality of flashlamps are movable sequentially to a firing position and (b) the assembly is adapted for attachment to a camera having a firing circuit for igniting a flashlamp in the firing position, the improvement comprising:

a flashlamp advancing member made of an electrically conductive material and disposed to form an integral part of the firing circuit in a camera when the photoflash assembly is attached to the camera;

the advancing member being movable to establish an electrical connection with the respective flashlamps, one at a time, and to advance a flashlamp electrically connected with the advancing member to the firing position, whereby the flashlamp may be ignited by the firing circuit.

According to another form of the invention, there is provided, in a camera adapted for use with a multilamp flash assembly having an electrically conductive advancing member movable to establish an electrical connection sequentially with the respective flashlamps and to advance a flashlamp electrically connected with the advancing member to a firing position, the combination comprising:

a flashlamp firing circuit for igniting a flashlamp in the firing position, the circuit including an electrically conductive actuator disposed for electrical connection with the advancing member to integrate the member into the circuit;

means supporting the actuator for movement in electrical connection with the advancing member to move the member to advance a flashlamp to the firing position; and means for moving the actuator.

In a preferred embodiment of the multilamp flash assembly, the flashlamps are supported in spaced relation on an endless movable belt for movement with the belt. Each lamp has a pair of exposed lead segments crimped about a corresponding portion of the belt. A flashlamp and belt advancing leaf spring is normally positioned at a predetermined location to contact only one of the lead segments of an unused flashlamp adjacent such location, to establish an electrical connection with the one lead segment. Because the advancing spring is resiliently flexible, the spring can be temporarily deformed to move against the one lead segment, to advance the unused flashlamp to the firing position and to move another lamp to adjacent the predetermined location. Moreover, the advancing spring inherently will re-form (i.e., recover its initial shape) to re-position itself at the predetermined location for contact with only one of the lead segments of the next flashlamp adjacent the predetermined location.

In a preferred embodiment of the camera, the flashlamp firing circuit includes an electrical contact for contacting the other lead segment (i.e., the lead segment not contacted by the advancing spring) of an unused flashlamp in the firing position. The actuator in the firing circuit, which electrically connects with the advancing spring when the flashlamp assembly is attached to the camera, is supported for movement to temporarily deform the advancing spring and to permit the spring to re-form. The electrical connection of the respective lead segments of an unused flashlamp in the firing position with the advancing spring and the electrical contact of the firing circuit enables the circuit to ignite such lamp.

BRIEF DESCRIPTION OF THE DRAWINGS

The invention will be described with respect to the drawings, wherein.

DESCRIPTION OF THE PREFERRED EMBODIMENT

Because multilamp flash assemblies and cameras adapted for use with such assemblies are well known, this description will be directed in particular to those elements of a flash assembly and a camera which form part of or cooperate directly with the preferred embodiment. It is to be understood, however, that other elements not specifically shown or described may take various forms known to persons of ordinary skill in the art.

Flash Assembly

Figure 1:
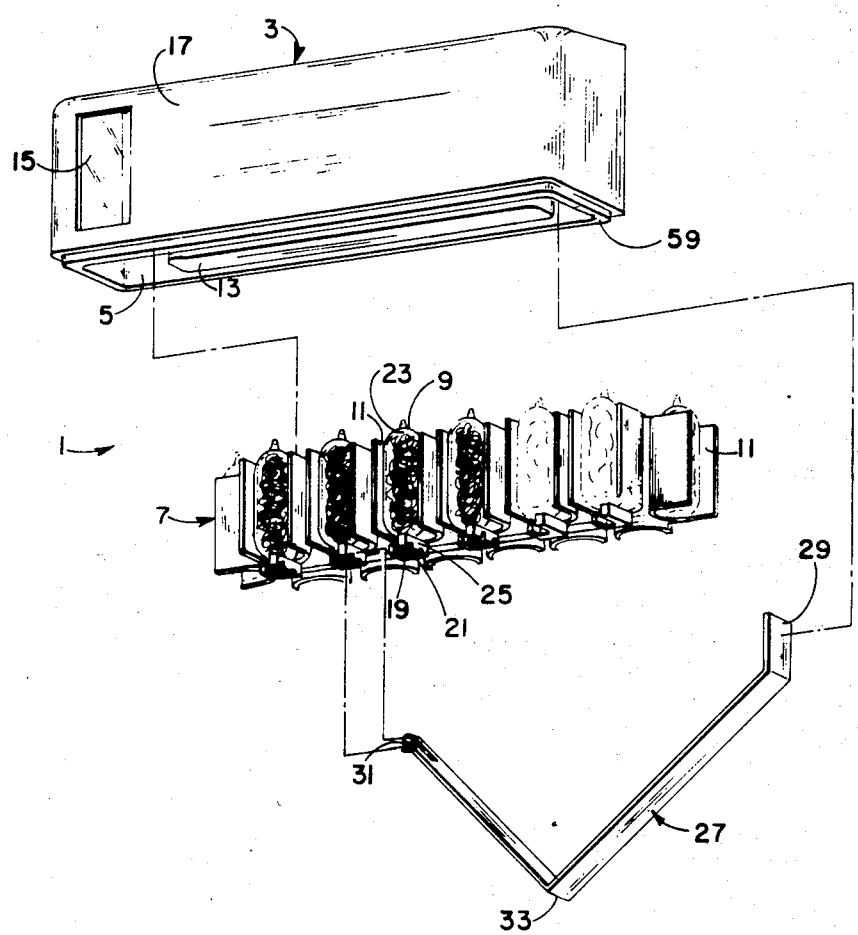
FIG. 1 is an exploded perspective view of a multilamp flash assembly, according to a preferred embodiment of the invention.

Referring now to the drawings, and in particular to FIG. 1, there is shown a multilamp flash assembly 1 having an assembly housing 3 which is closed except at its bottom 5. An endless belt 7 supports a plurality of electrically-ignited flashlamps 9 in spaced relation in respective pods 11 on the belt. The belt 7 is mounted on an elongate support 13 in the assembly housing 3 for incremental movement about the support in a loop-like path to advance the respective flashlamps 9 sequentially to a firing position. In the firing position, a flashlamp 9 is located behind a window 15 in a front face 17 of the assembly housing 3. Although not illustrated, suitable curved reflectors are provided in the pods 11 at respective locations behind the flashlamps 9 to reflect the light from an ignited lamp outwardly through the window 15. Each of the flashlamps 9 has a pair of exposed lead segments 19 and 21 which protrude from the lamp envelope 23 and are crimped about a corresponding rigid post 25 on the belt 7. The belt 7, including the pods 11 and the posts 25, may be molded as a unit from a plastic material.

Figure 3:
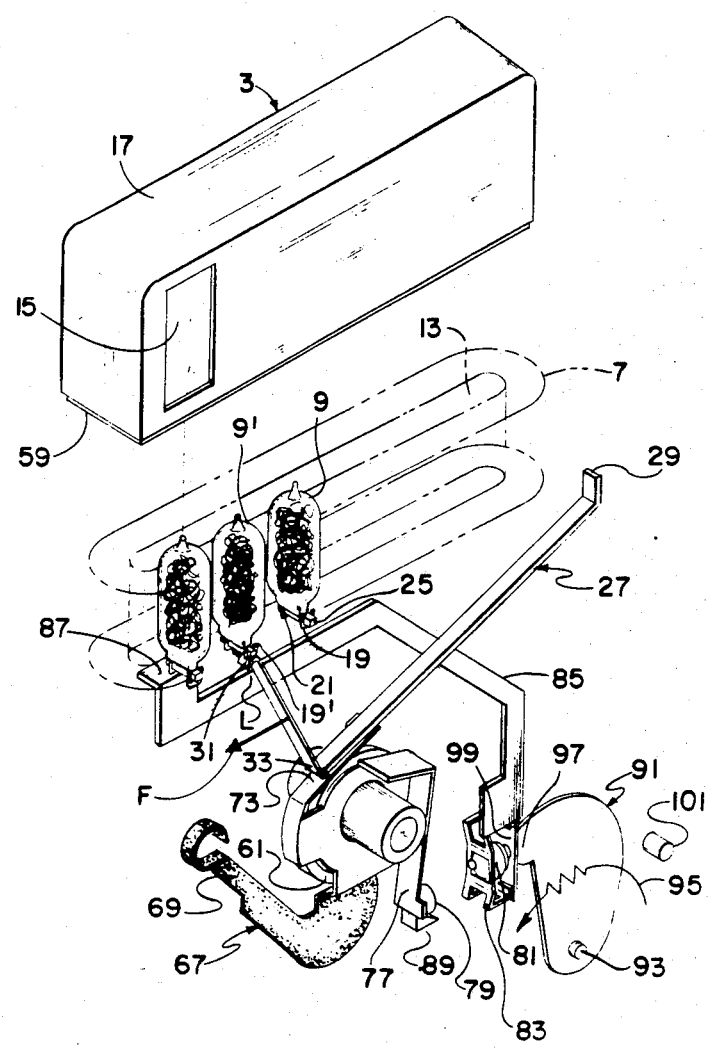
FIGS. 3 and 4 are front perspective views of the interior mechanisms of the flash assembly and the camera, depicting their manner of cooperating operation.

A flashlamp and belt advancing leaf spring 27 has a fixed end portion 29 mounted on an interior surface of the assembly housing 3 and a free end portion 31 normally positioned at a predetermined location L, as shown in FIG. 3, to separately contact the respective lead segments 19 of the unused flashlamps 9 sequentially moved to adjacent such location. The predetermined location L is spaced an appropriate distance from the location for the firing position such that whenever one flashlamp is in the firing position the next available flashlamp is adjacent the predetermined location. The advancing spring 27 is made of an electrically conductive material to establish an electrical connection with the lead segment 19' of an unused flashlamp 9' adjacent the predetermined location L, as well as for another reason arising in connection with a camera adapted for use with the flash assembly 1. Details of the camera will be subsequently described.

Figure 4:
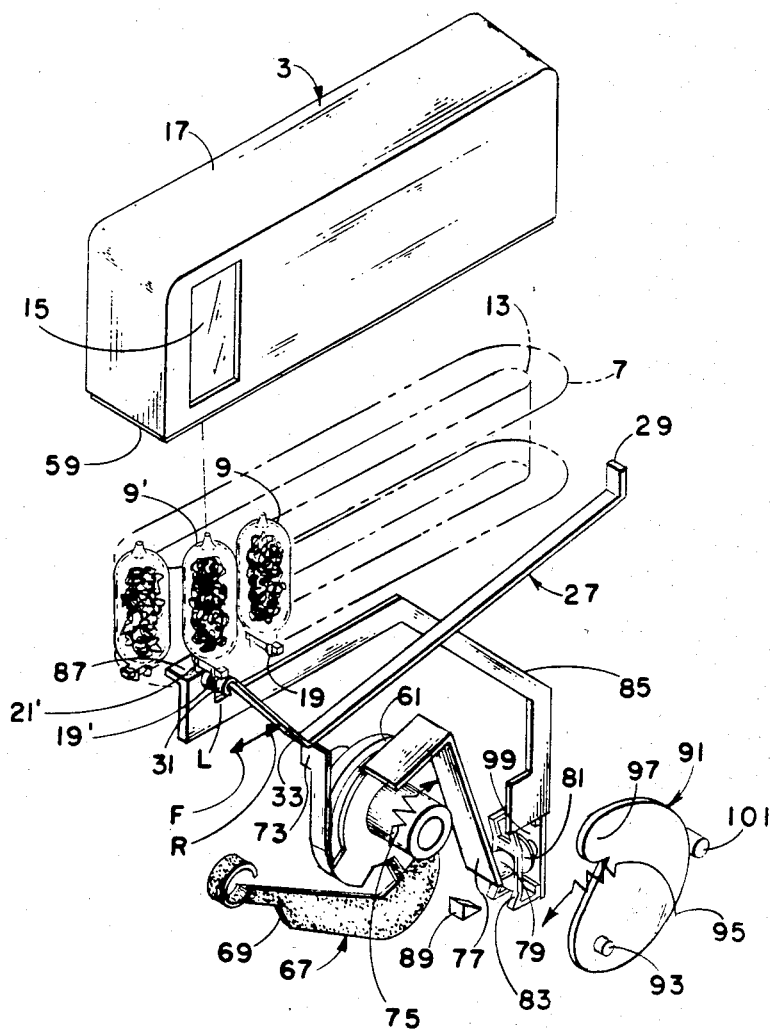

An intermediate v-shaped portion 33 of the advancing spring 27 extends between the fixed and free end portions 29 and 31 of the spring. The v-shaped portion 33 protrudes from the open bottom 5 of the assembly housing 3 for electrical connection with a firing circuit in the camera when the flash assembly 1 is attached to the camera. Because the advancing spring 27 is resiliently flexible, the spring can be temporarily deformed to shift its free end portion 31 in a forward direction F, as shown in FIG. 4, against the lead segment 19' of the unused flashlamp 9', to advance the unused lamp (together with a short section of the endless belt 7) from adjacent the predetermined location L to the firing position behind the window 15 in the assembly housing 3, and to move another lamp to adjacent the predetermined location. Moreover, the advancing spring 27 inherently can re-form (i.e., recover its initial shape) to shift its free end portion 31 in a reverse direction R, separating the free end portion from the lead segment 19' and re-positioning the free end portion at the predetermined location L for contact with the lead segment of the next flashlamp adjacent that location. Thus, the advancing spring 27 can operate as an electrical contact for the lead segments 19 of the respective flashlamps 9 and to advance the respective flashlamps sequentially to the firing position.

Camera

Figure 2:
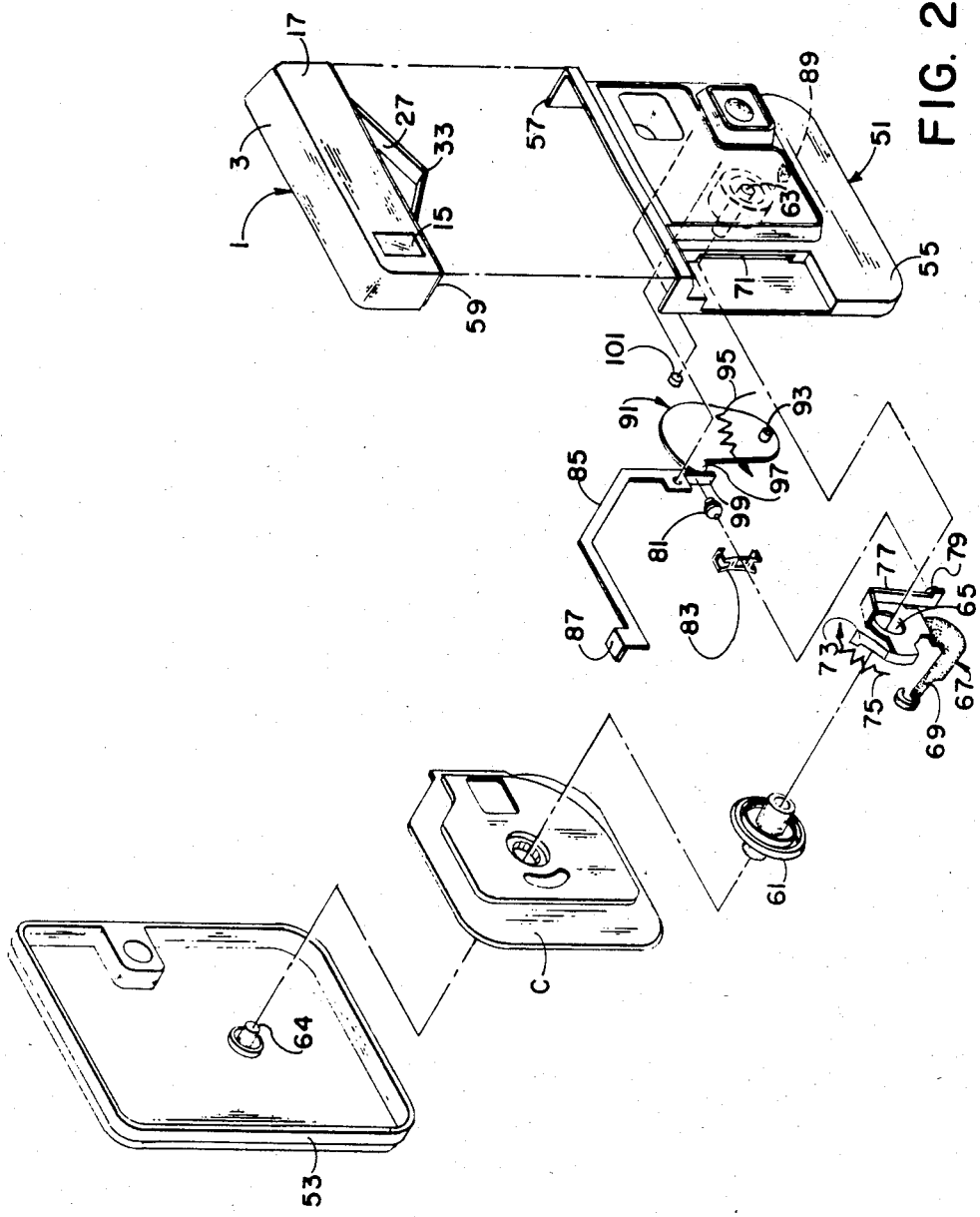
FIG. 2 is an exploded perspective view of a camera adapted for use with the flash assembly, according to the preferred embodiment of the invention.

FIG. 2 shows a disk film camera 51 adapted for use with the multilamp flash assembly 1. The camera 51 includes a rear housing portion 53 and a front housing portion 55, which are molded from a plastic material to mate together, but which may be separated to receive a disk film cartridge C in the camera. Although not shown, suitable locking means is provided for maintaining the rear and front housing portions 53 and 55 closed together. The front housing portion 55 is open at its top 57 to receive a stepped edge 59 of the flash assembly 1, to attach the flash assembly to the camera 51. A cap, not shown, may be provided for closing the open top 57 of the front housing portion 55 when the flash assembly 1 is removed from the camera 51.

A plastic hub 61 is rotatably supported on a pair of integrally formed, interior posts 63 and 64 of the rear and front housing portions 53 and 55, respectively. The hub 61 extends through a central opening 65 of a combination member 67 and is secured to the combination member to support the member for pivotal movement in opposite directions with the hub about the post 63. The combination member 67 is fabricated from a single sheet of electrically conductive material and includes an operating arm 69 which is coated with a non-conducting material. The operating arm 69 protrudes from a light-trapping slot 71 in the front housing portion 55. As shown in FIG. 3, an actuator 73 on the combination member 67 is disposed for contact with the v-shaped portion 33 of the advancing spring 27 of the flash assembly 1 to establish an electrical connection between the combination member and the advancing spring when the flash assembly is attached to the camera 51. If the operating arm 69 is manually pushed down, the combination member 67 will pivot in a counterclockwise direction with the hub 61, as viewed in FIG. 3, and the actuator 73 in turn will temporarily deform the advancing spring 27, causing the advancing spring to shift its free end portion 31 in the forward direction F against the lead segment 19' of the unused flashlamp 9' to advance the unused lamp from adjacent the predetermined location L to the firing position. Advancement of the flashlamp 9' to the firing position is shown in FIG. 4. If the operating arm 69 is then released, a return spring 75 will pivot the combination member 67 in a clockwise direction with the hub 61, as viewed in FIG. 4, and the actuator 73 in turn will retract from the advancing spring 27, permitting the advancing spring to re-form (i.e., recover its initial shape) to shift its free end portion 31 in the reverse direction R. The free end portion 31 will separate from the lead segment 19' of the flashlamp 9' in the firing position, and be re-positioned at the predetermined location L for contact with the lead segment of the next flashlamp moved to adjacent that location.

As shown in FIG. 2, a piezoelectric firing spring 77 on the combination member 67 includes an electrically conductive hammer 79 for striking a piezoelectric generator 81, e.g., a piezoelectric crystal, to produce an electrical pulse for flash firing. The piezoelectric generator 81 is secured by a retaining clip 83 to an electrically conductive contact strip 85 mounted on an interior surface of the front housing portion 55. The contact strip 85 has a contact plateau 87 disposed adjacent the location for the firing position of the respective flashlamps 9 to contact the lead segment 21' (but not the lead segment 19') of an unused lamp 9' in the firing position, as shown in FIG. 4, to establish an electrical connection with the first-mentioned lead segment. If the operating arm 69 is manually pushed down to pivot the combination member 67 in a counterclockwise direction as previously described, the firing spring 77 will bend until it springs free of a retaining ramp 89 mounted on an interior surface of the front housing portion 55. The released spring 77 in turn will cause its hammer 79 to strike the piezoelectric generator 81, producing an electrical pulse. Because the combination member 67, including its actuator 73 and its firing spring 77, is electrically conductive and the advancing spring 27, the hammer 79, and the contract strip 85 are electrically conductive, they combine to form a flash firing circuit which then connects the piezoelectric generator 81 and the pair of lead segments 19' and 21' of the unused lamp 9' in the firing position. Consequently, the electrical pulse produced by the piezoelectric generator 81 will ignite the lamp 9'.

A rebound type shutter blade 91, similar to the one shown in commonly assigned U.S. Pat. No. 4,183,648, granted Jan. 15, 1980 to Harvey and Wolcott, is mounted for pivotal movement about a mounting pin 93 fixed to an interior surface of the front housing portion 51. The shutter blade 91 is biased by a return spring 95 to pivot in a counterclockwise direction, as viewed in FIG. 2, about the pin 93 to a closed position covering a picture-taking lens, not shown. In the closed position, an impact receiving nose 97 of the shutter blade 91 is lightly held by the return spring 95 against a small section 99 of the contact strip 85 opposite the piezoelectric generator 81. When the piezoelectric generator 81 is struck by the hammer 79 to produce an electrical pulse for flash firing, the mechanical shock to the generator is transmitted through the generator and the strip section 99 to the nose 97 of the shutter blade 91. The shutter blade 81 is activated by the transmitted shock, as shown in FIG. 4, to pivot from its closed position to an opened position, in which the blade uncovers the picture-taking lens to initiate a film exposure in synchronization with flash firing.

An adjustable rebound stop, not shown, is movable into and out of the arcuate path of the shutter blade 91 between the blade and a fixed rebound stop 101 mounted on an interior surface of the front housing portion 55. When the camera 51 is used without the flash assembly 1, the adjustable rebound stop is moved into the arcuate path of the shutter blade 91 to prevent the blade from reaching the fixed rebound stop 101, and thereby shortening the exposure interval. Conversely, when the flash assembly 1 is attached to the camera 53, the adjustable rebound stop is removed from the arcuate path of the shutter blade 91 to permit lengthened travel of the blade to the fixed rebound stop 101, and thereby increasing the exposure interval. The details of the adjustable rebound stop and a suitable device for moving it into and out of the arcuate path of the shutter blade are shown in U.S. Pat. No. 4,183,648.

While the invention has been described with reference to a preferred embodiment, it will be understood that various modifications may be effected within the ordinary skill in the art without departing from the scope of the invention. For example, in an alternate embodiment, not shown, the advancing leaf spring 27 is located in the camera 51, rather than in the flash assembly 1. In such case, the fixed end portion 29 of the advancing spring 27 is mounted on an interior surface of the front housing portion 55 of the camera 51, and the free end portion 31 of the advancing spring protrudes from the open top 57 of the front housing portion for positioning at the predetermined location L when the flash assembly 1 is attached to the camera 51.

In the preferred embodiment, the flash assembly 1 is designed as a disposable item. However, this is not a requirement. For example, the flash assembly 1 could be designed so that only the endless belt 7 with the flashlamps 9 is disposable. In such case, the belt 7 with the flashlamps 9 would be removable from the support 13 in the assembly housing 3. The assembly housing would comprise a permanent part of the camera 51, but would be removable from the camera to receive the belt and the flashlamps.

According to another variation, the free end portion 31 of the advancing spring 27, when positioned at the predetermined location L, only contacts one of the rigid posts 25 on the belt 7. Contact between the fixed end portion 31 and the lead segment 19 crimped about that post occurs as the flashlamp 9 is moved into its firing position.

We claim:

1. In a photoflash assembly of the type wherein (a) a plurality of flashlamps are movable sequentially to a firing position and (b) said assembly is adapted for attachment to a camera having a firing circuit for igniting a flashlamp in the firing position, the improvement comprising:
   a flashlamp advancing member made of an electrically conductive material and disposed to form an integral part of the firing circuit in a camera when said photoflash assembly is attached to the camera;
   means supporting said advancing member for movement to establish an electrical connection with the respective flashlamps, one at a time, and to advance a flashlamp electrically connected with the advancing member to the firing position.

2. In a photoflash assembly of the type wherein (a) a plurality of flashlamps are movable sequentially to a firing position, (b) each of said flashlamps has at least one exposed lead segment, and (c) said assembly is adapted for attachment to a camera having a firing circuit for igniting a flashlamp in the firing position, the improvment comprising:
   a flashlamp advancing member made of electrically conductive material and disposed to form an integral part of the firing circuit in a camera when said photoflash assembly is attached to the camera;
   said advancing member normally positioned at a predetermined location to contact an exposed lead segment of a unused flashlamp, for establishing an electrical connection between such lead segment and the firing circuit, and being movable in one direction against the lead segment to advance the flashlamp to the firing position and in another direction to re-position at the predetermined location for contact with an exposed lead segment of another flashlamp.

3. The improvement as recited in claim 2, wherein said flashlamp advancing member has a fixed end portion mounted on said photoflash assembly and a free end portion normally positioned at the predetermined location, said advancing member being resiliently flexible to enable the member to be temporarily deformed to shift its free end portion in the one direction from the predetermined location and to enable the member to re-form to return its free end portion in the other direction to the predetermined location.

4. The improvement as recited in claim 3, wherein said advancing member has an intermediate portion extending between its fixed and free end portions and protruding from said photoflash assembly for electrical connection with the firing circuit in a camera when said photoflash assembly is attached to the camera.

5. The improvement as recited in claim 2, wherein said photoflash assembly includes an endless movable belt supporting the respective flashlamps in spaced relation for movement in sequence adjacent the predetermined location, and each of said flashlamps has an exposed lead segment fixedly mounted on the belt.

6. In a photoflash assembly of the type wherein a plurality of flashlamps are movable sequentially to a firing position and each of said flashlamps has a pair of exposed lead segments, and wherein said assembly is adapted for attachment to a camera having a flashlamp firing circuit with an electrical contact for contacting only one of the lead segments of a flashlamp in the firing position, the combination comprising:
   a flashlamp advancing member made of electrically conductive material and disposed to form an integral part of the firing circuit in a camera when said photoflash assembly is attached to the camera;
   said advancing member being positionable adjacent a flashlamp for contact only with the other lead segment of the flashlamp, for establishing an electrical connection between the other lead segment and the firing circuit, and being movable in contact with the other lead segment to advance the flashlamp to the firing position, whereby the flashlamp may be ignited by the firing circuit.

7. The combination as recited in claim 6, wherein said flashlamp advancing member is resiliently flexible to enable the advancing member to be temporarily deformed in one direction to advance an unused flashlamp to the firing position and to enable said advancing member to re-form in another direction to position itself adjacent another flashlamp.

8. The combination as recited in claim 6, wherein said photoflash assembly includes an endless movable belt supporting the respective flashlamps in spaced relation for movement with said belt, and wherein each of said flashlamps has its pair of exposed lead segments crimped about a corresponding portion of the belt.

9. In a photographic camera adapted for use with a multilamp flash assembly having an electrically conductive advancing member movable to establish an electrical connection sequentially with the respective flashlamps and to advance a flashlamp electrically connected with the advancing member to a firing position, the combination comprising:
   a flashlamp firing circuit for igniting a flashlamp in the firing position, said circuit including an electrically conductive actuator disposed for electrical connection with the advancing member to integrate the member into said circuit;
   means supporting said actuator for movement in electrical connection with the advancing member to move the member to advance a flashlamp to the firing position; and
   means for moving said actuator.

10. The combination as recited in claim 9, wherein the flashlamp advancing member is resiliently flexible to enable it to be temporarily deformed to advance a flashlamp in electrical connection with the advancing member to the firing position, and wherein said supporting means supports said actuator for movement to temporarily deform the advancing member.

11. The combination as recited in claims 9 or 10, wherein the flashlight advancing member is movable in one direction to establish an electrical connection with the respective flashlamps and in another direction to advance a flashlamp to the firing position, and wherein said supporting means supports said actuator for movement in opposite directions to permit the advancing member to move in the one direction and to move the advancing member in the other direction.

12. The combination as recited in claim 9, wherein said firing circuit includes a piezoelectric generator for producing an electrical pulse to ignite a flashlamp in the firing position and an electrically conductive striker for striking said piezoelectric generator to produce the electrical pulse, said striker being electrically connected to said actuator.

13. The combination as recited in claim 12, wherein said supporting means supports said striker for movement with said actuator to induce the striker to strike said piezoelectric generator in response to the actuator moving the flashlamp advancing member to advance a flashlamp to the firing position.

14. In a photographic camera adapted for use with a multilamp flash assembly in which (a) each of the flashlamps has a pair of exposed lead segments and (b) an electrically conductive advancing member is movable in contact with only one of the lead segments of a flashlamp to maintain an electrical connection with the one lead segment and to advance the flashlamp to a firing position, the combination comprising:

a flashlamp firing circuit for igniting a flashlamp in the firing position;

said firing circuit including an electrical contact disposed adjacent the location for the firing position to contact only the other lead segment of a flashlamp in the firing position, for establishing an electrical connection with the other lead segment, and an electrically conductive actuator disposed for electrical connection with the advancing member to integrate the member into said firing circuit; and means supporting said actuator for movement in electrical connection with the advancing member to move the member to advance a flashlamp to the firing position, whereby the flashlamp may be ignited by said firing circuit.

15. In a photographic camera of the type wherein (a) flashlamp advancing means is provided for moving a plurality of flashlamps sequentially to a firing position and (b) a firing circuit is provided for igniting a flashlamp in the firing position, the improvement comprising:

said advancing means including an advancing member made of an electrically conductive material and forming an integral part of said firing circuit; and means for moving said advancing member to establish an electrical connection with the respective flashlamps, one at a time, and to advance a flashlamp electrically connected with the advancing member to the firing position.

16. In a photographic camera adapted for use with a multilamp flash assembly and of the type wherein (a) flashlamp advancing means is provided for moving a plurality of flashlamps in the assembly sequentially to a firing position and (b) a firing circuit is provided for igniting a flashlamp in the firing position, the improvement comprising:

said advancing means including an electrically conductive advancing member forming an integral part of said firing circuit and disposed for electrical connection sequentially with the respective flashlamps when the multilamp assembly is used with said camera; and manually operated means for moving said advancing member to move a flashlamp electrically connected with the advancing member to the firing position.

17. In a photographic camera adapted for use with a multilamp flash assembly in which the respective flashlamps each have a pair of exposed lead segments, and wherein said camera is of the type having (a) advancing means for moving the respective flashlamps to a firing position and (b) a firing circuit for igniting a flashlamp in the firing position, the improvement comprising:

said advancing means including an electrically conductive advancing member positionable in contact with only one of the lead segments of a flashlamp to establish an electrical connection with the one lead segment and movable in contact with the one lead segment to advance the flashlamp to the firing position;

said firing circuit including an electrical contact disposed adjacent the location for the firing position to contact only the other lead segment of a flashlamp in the firing position, for establishing an electrical connection with the other lead segment, and an electrically conductive actuator disposed for electrical connection with said advancing member to integrate the member into said firing circuit; and means supporting said actuator for movement in electrical connection with said advancing member to move the member to advance a flashlamp to the firing position, whereby the flashlamp may be ignited by said firing circuit.

18. The improvement as recited in claim 17, wherein said advancing member is resiliently flexible to enable the advancing member to be temporarily deformed in one direction to advance a flashlamp to the firing position and to enable said advancing member to re-form in another direction to position itself in contact with only one of the lead segments of a flashlamp, and said supporting means supports said actuator for movement to temporarily deform said advancing member in the one direction.

* * * * *